United States Patent [19]

Lumpkin

[11] Patent Number: 5,624,334
[45] Date of Patent: Apr. 29, 1997

[54] LOW-FRICTION DERAILLEUR CABLE ROUTER

[75] Inventor: Wayne R. Lumpkin, Littleton, Colo.

[73] Assignee: Avid Enterprises, Inc., Englewood, Colo.

[21] Appl. No.: 552,743

[22] Filed: Nov. 3, 1995

[51] Int. Cl.$^6$ ............................ F16H 9/06; F16H 59/00
[52] U.S. Cl. ........................................ 474/79; 474/80
[58] Field of Search ..................... 474/78–82; 180/223, 180/231

[56] References Cited

U.S. PATENT DOCUMENTS

| 3,979,962 | 9/1976 | Kebsch | 474/82 |
| 4,002,080 | 1/1977 | Huret et al. | 474/82 |
| 4,437,848 | 3/1984 | Shimano | 474/82 |
| 4,832,662 | 5/1989 | Nagano | 474/82 X |
| 5,201,236 | 4/1993 | Nagano | 474/80 X |

*Primary Examiner*—Roger J. Schoeppel
*Attorney, Agent, or Firm*—Swanson & Bratschun LLC

[57] ABSTRACT

A derailleur cable router changes the direction of a derailleur cable operatively attached to a rear derailleur to a bicycle frame. The rear derailleur is actuated by variation in tension applied to the derailleur cable from a direction rearward of the derailleur. The tension in the derailleur cable is controlled by a shifter attached to a distal end of the derailleur cable, the shifter being mounted to the bicycle frame forward of the derailleur. The derailleur cable includes a cable housing around at least a portion of the derailleur cable with the derailleur housing being fixed against lengthwise movement relative to the bicycle frame by attachment to the bicycle frame. The derailleur cable router includes a frame having a first and a second end. A housing is provided at the first end of the frame and the housing is attachable to a derailleur cable housing. A second housing is provided at the second end of the frame, the second housing being attachable to a derailleur cable feed of a rear derailleur. The first housing includes a first cable channel for receiving a derailleur cable from within a derailleur cable housing and the second housing includes a second cable channel for passing a derailleur cable to a rear derailleur cable feed. A pulley having an axis of rotation in a circumferential groove is mounted to the frame for rotation about its axis of rotation intermediate the first and second ends of the frame with the circumferential groove of the pulley aligned with the first and second cable channels so that a derailleur cable can be received in the first cable channel, engaged with a portion of the circumferential groove and passed through the second cable channel. Preferably the first cable channel, the second cable channel channels so that a derailleur cable can be received in the first cable channel, engaged with a portion of the circumferential groove and passed through the second cable channel. Preferably the first cable channel, the second cable channel and the circumferential groove of the pulley all lie within substantially the same plane.

17 Claims, 5 Drawing Sheets

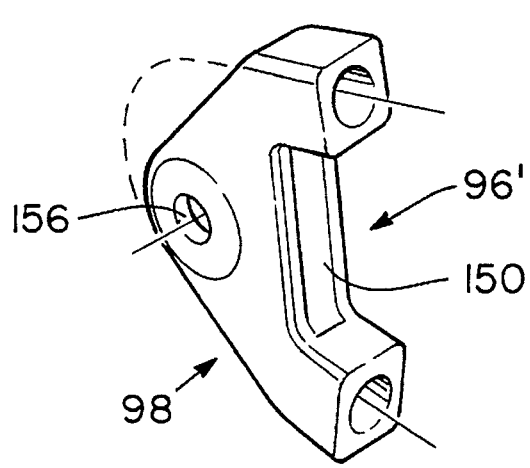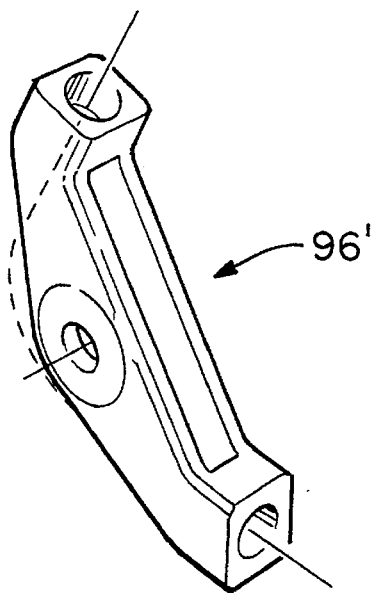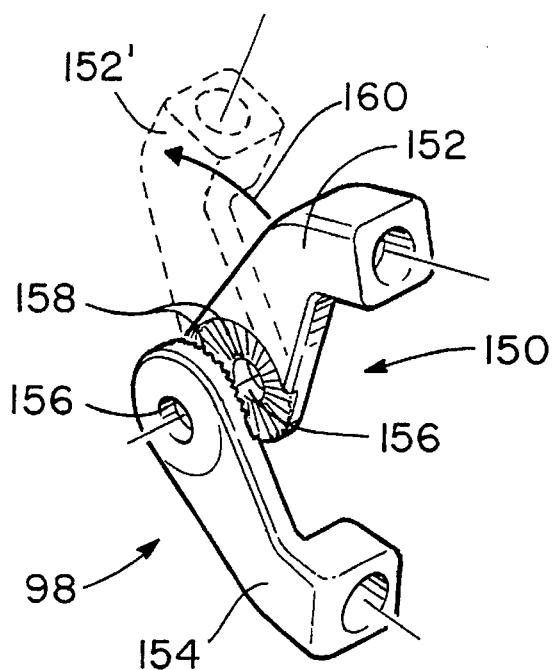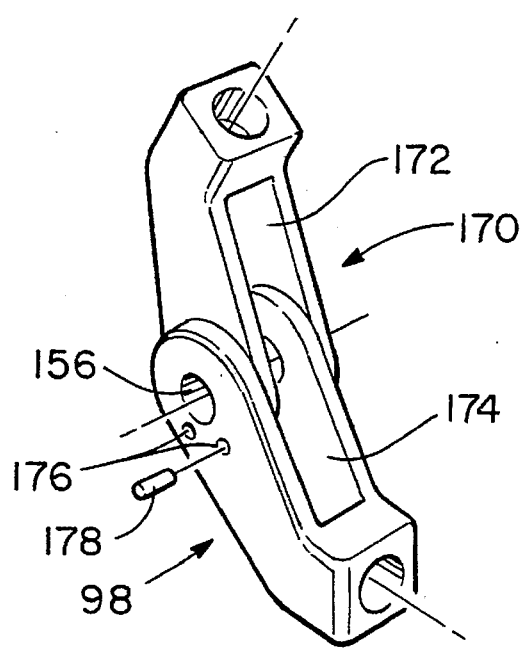
FIG. 7
FIG. 8
FIG. 9
FIG. 10

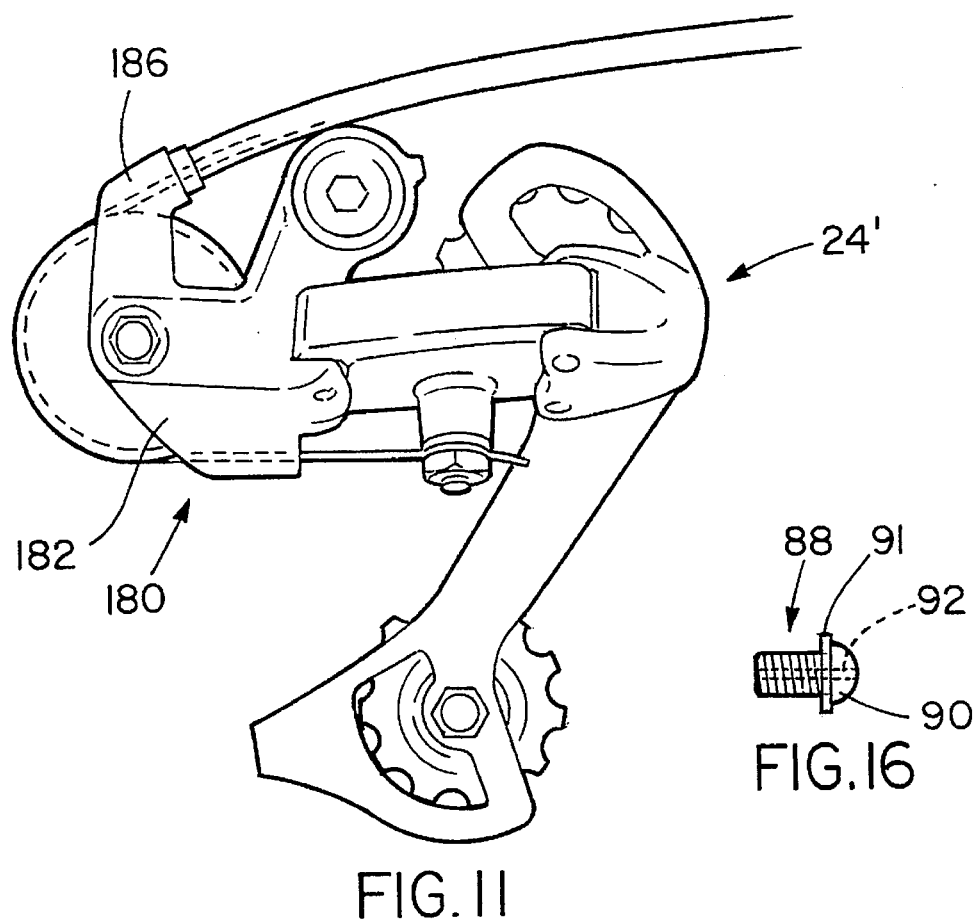
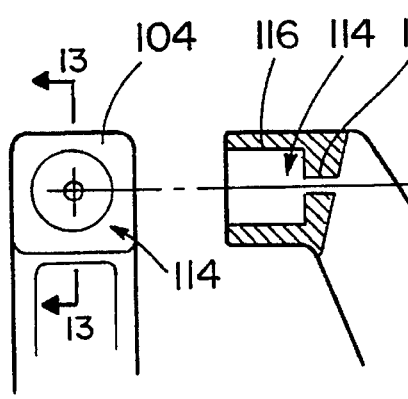 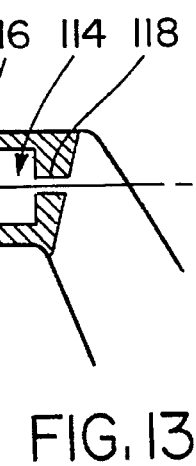 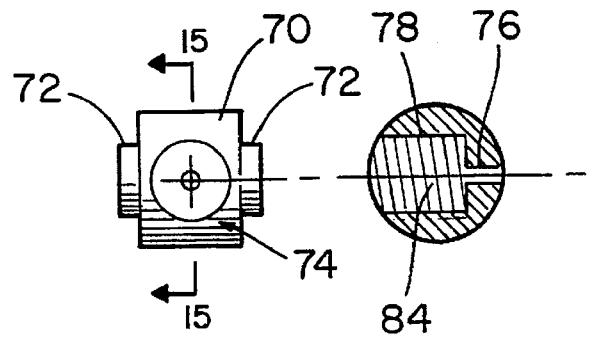
FIG.11   FIG.16   FIG.12   FIG.13   FIG.14   FIG.15

LOW-FRICTION DERAILLEUR CABLE ROUTER

This application claims the benefit of U.S. Provisional application Ser. No. 60/008,167 filed Oct. 31, 1995.

BACKGROUND OF THE INVENTION

1. Technical Field

The present invention is directed toward a guide for bicycle cables, and more particularly toward a low-friction derailleur cable router.

2. Background Art

Bicycle drive systems have been under constant redesign and refinement since bicycles were introduced over one hundred years ago. It is now common-place to have bicycles having between 1 and 24 "gears" or "speeds" allowing a bicyclist to select an appropriate gear as riding conditions change. A typical prior art rear wheel drive system is illustrated in FIG. 1. A rear wheel 10 is mounted to a rear drop out 12 of a bicycle frame by means of an axle 14. A hub 16 contains ball bearings or the like for providing smooth low-friction rotation of the wheel 10 about the axle 14. Adjacent the hub 16 is a rear cluster 18 which contains a plurality of sprockets 20 of increasing diameter. A chain 22 engages a select sprocket 20 and the chain 22 can be moved between the sprockets by actuation of the rear derailleur 24. The rear derailleur 24 is actuated by changing the tension in the derailleur cable 26 by movement of a shifter (not shown) mounted to the bicycle frame forward of the rear derailleur 24 connected to a distal end of the derailleur cable 26. As is appreciated by almost all bicycle users, the smaller the sprockets 20 engaged by the chain 22, the greater the amount of rotation of the wheel 10 for a given distance of chain movement.

A typical rear derailleur 24 as illustrated in FIG. 1 includes an actuator arm 28 to which the derailleur cable 26 is fixedly attached at its proximal end by means of a clamp 30 or other connecting structure. Most rear derailleurs in use today are "rear fed", meaning that the derailleur cable 26 is fed to a derailleur 24 from the rear, as is illustrated in FIG. 1. Thus, a derailleur cable feed 32 receives the cable 26 from the rear of the derailleur. In order to facilitate the change of direction of the derailleur cable 26 from a forward portion of the bicycle to the rear of the bicycle, a flexible coupling or cable housing 34 is provided between the derailleur cable feed 32 and a stop 36 or other apparatus fixed to the bicycle frame. The cable housing 34 is flexible laterally but ridged axially. It therefore maintains the length of cable running inside of the cable housing 34. A barrel tension adjuster 36 may be provided between one end of the cable housing 34 and the derailleur cable feed 32 for increasing or decreasing the effective length of the cable 26 to adjust the rear derailleur 24.

Most rear derailleurs on the market and in use today are rear fed derailleurs. In addition, the use of the cable housing 34 to direct the derailleur cable 26 to the rear of the rear derailleur 24 is virtually exclusive. While the cable housing 34 has proven to be effective at routing the derailleur cable 26 in this manner, it is not without some serious drawbacks. First, as illustrated in FIG. 1 the cable housing 34 forms a rather large loop extending above and behind the rear derailleur 24. This loop is unsightly and gives a bicycle a decidedly "clunky" or "low-tech" appearance. In addition, the loop formed by the cable housing 34 often becomes tangled with or snagged with obstructions during handling and riding of a bicycle. This problem is particularly acute where the bike is used for off-road applications such as mountain biking. Furthermore, even for non-off-road applications such as road racing the loop 34 provides undesirable wind drag. The cable housing 34 is also a source of considerable friction on the derailleur cable 26. This friction increases markedly as the bike is ridden over time and dust and grit work their way inside the housing 34. Also, as the loop is made larger increased force is required to move the cable 26. This increased force is due to the longer friction causing surface and the fact that the resulting force applied by the derailleur cable 26 to the derailleur actuator arm 28 is dissipated by the derailleur cable 26 being directed over a wider arc.

The present invention is directed toward overcoming one or more of the problems stemming from the use of the cable housing to route a derailleur cable to a rear-fed rear derailleur.

SUMMARY OF THE INVENTION

The present invention is directed to a derailleur cable router for changing the direction of a derailleur cable operatively attached to a rear-fed rear derailleur mounted to a bicycle frame. The rear derailleur is actuated by variation of the tension applied to the derailleur cable from a direction rearward of the derailleur. The tension in the derailleur cable is controlled by a shifter attached to a distal end of the derailleur cable, the shifter being mounted to the bicycle frame forward of the derailleur. The derailleur cable includes a cable housing around at least a portion of the derailleur cable with the derailleur cable housing being fixed against lengthwise movement relative to the bicycle frame by attachment to the bicycle frame. The derailleur cable router includes a frame having a first and a second end. A housing is provided at the first end of the frame and the housing is attachable to a derailleur cable housing. A second housing is provided at the second end of the frame, the second housing being attachable to a derailleur cable feed of a rear derailleur. The first housing includes a first cable channel for receiving a derailleur cable from within a derailleur cable housing and the second housing includes a second cable channel for passing a derailleur cable to a rear derailleur cable feed. A pulley having an axis of rotation and a circumferential groove is mounted to the frame for rotation about its axis of rotation intermediate the first and second ends of the frame with the circumferential groove of the pulley aligned with the first and second cable channels so that a derailleur cable can be received in the first cable channel, engaged with a portion of the circumferential groove and passed through the second cable channel. Preferably the first cable channel, the second cable channel and the circumferential groove of the pulley all lie within substantially the same plane.

The first and second housings preferably extend the same direction normal of a plane formed by the body of the frame. The first housing may include a receiving bore coaxial with the first cable channel, the bore being sized to receive the leading end of a ferrule attached to an end of a cable housing. The second housing may have a leading surface through which the second cable channel passes, the leading surface being configured to abut a derailleur cable feed of a rear derailleur. This leading surface may be arcuate. Preferably a structure providing for brake away attachment is provided between the derailleur cable feed and the second housing. A preferred embodiment of the brake away attachment is a screw configured to be threadably received in a derailleur cable feed of a rear derailleur, the screw having a semi-spherical head received by a second bore coaxial with the second channel in the leading surface of the second housing, the screw further including an axial derailleur cable receiving passage. The brake away structure could alternatively be a spring or a length of cable housing.

Another aspect of the derailleur cable router described above has a two part frame consisting of a first leg having a proximal end and a distal end to which the first housing is attached and a second leg having a proximal end and a distal end to which the second housing is attached. The proximal ends of the first and second legs are connected by a structure providing for selective relative rotation between the first and second legs.

Another aspect of the present invention is a rear derailleur of a bicycle for mounting to a bicycle frame in operative association with a derailleur cable. The rear derailleur is actuated by variation in the amount of tension applied by a derailleur cable attached to an actuator arm of the derailleur from a direction rearward of the derailleur. The tension in the derailleur cable is controlled by a shifter attached to a distal end of the derailleur cable, the shifter being mounted to the bicycle frame forward of the derailleur. The derailleur cable includes a cable housing around at least a portion of the derailleur cable. The derailleur cable housing is attached to the frame to fix it against lengthwise movement relative to the bicycle frame. The rear derailleur comprises a frame having a first end and a housing for attachment to a derailleur cable housing and a second end integrally attached to the actuator arm of the derailleur. The housing includes a first cable channel for receiving a derailleur cable from within the derailleur cable housing from a forward direction relative to the rear derailleur and the second end of the frame includes a second cable channel for passing a derailleur cable to a cable clamp on the actuator arm of the rear derailleur. A pulley having an axis of rotation and a circumferential groove is rotatably mounted by its axis of rotation to the frame intermediate the first and second ends of the frame. The pulley is mounted so that a derailleur cable can be received in the first cable channel, engaged with a portion of the circumferential groove and passed out of the second cable channel for attachment to a cable clamp on the derailleur actuator arm.

The derailleur cable router of the present invention provides a compact structure for redirecting a derailleur cable coming from the front of a bicycle to rearwardly of a rear-feed rear derailleur. The router includes a pulley which engages the derailleur cable to provide the change of direction of the derailleur cable. The pulley provides a low friction bearing surface which all but eliminates friction forces which otherwise oppose movement of the derailleur cable. The cable router is always also very compact and rides behind the rear derailleur, virtually eliminating additional wind drag and further virtually eliminating a source of snagging with obstacles which plagued the prior art. The small turning radius of the derailleur cable router also optimizes force transmission between the derailleur cable and the derailleur, further diminishing the amount of force which must be applied to the derailleur cable in order to change the chain from engagement with a small rear sprockets to a larger rear sprockets. The cable router further includes a "break away feature" which allows the derailleur cable router to be pushed toward or away from the wheel by obstructions and the like while snapping back into the original position after the obstruction disengages the cable router. The cable router disclosed herein can also be manufactured from a small number of easily fabricated parts and requires a minimal amount of assembly. Thus, the many advantages discussed above can be provided simply and inexpensively. Moreover, the cable router can readily be attached to known rear feed rear derailleurs with a minimum of effort or could be integrally formed with a specially manufactured rear derailleur.

BRIEF DESCRIPTION OF THE DRAWINGS

FIGS. 7–8 are perspective views of a third embodiment of the low-friction derailleur cable router of the present invention;

FIGS. 9–10 are perspective views of adjustable frames for low-friction derailleur cable routers of the present invention;

FIG. 11 is a side elevational view which illustrates the low-friction derailleur cable router of the present invention integrally formed with a rear derailleur;

FIG. 12 is a front elevational view of a cable housing attachment housing in accordance with the present invention;

FIG. 13 is a sectional view taken along line 13—13 of FIG. 12;

FIG. 14 is a front elevational view of a linkage of FIGS. 3 and 4;

FIG. 15 is a cross-sectional view of the linkage of FIG. 14 taken along line 15—15 of FIG. 14; and FIG. 16 is an elevational view of a bolt for break-away attachment of the low-friction derailleur cable router to a rear derailleur.

DETAILED DESCRIPTION OF THE PREFERRED EMBODIMENT

Figure 1:
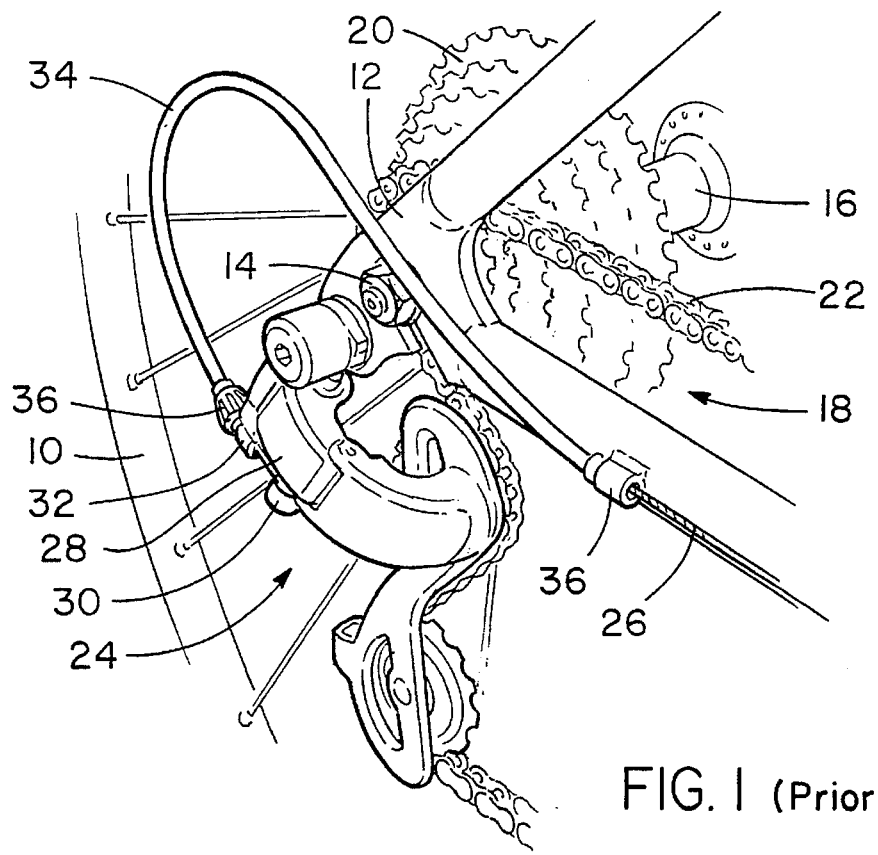
FIG. 1 is a perspective view which illustrates a prior art rear feed derailleur operatively attached to a bicycle frame with a derailleur cable directed to the rear of the rear feed derailleur by means of a cable housing.
Figure 2:
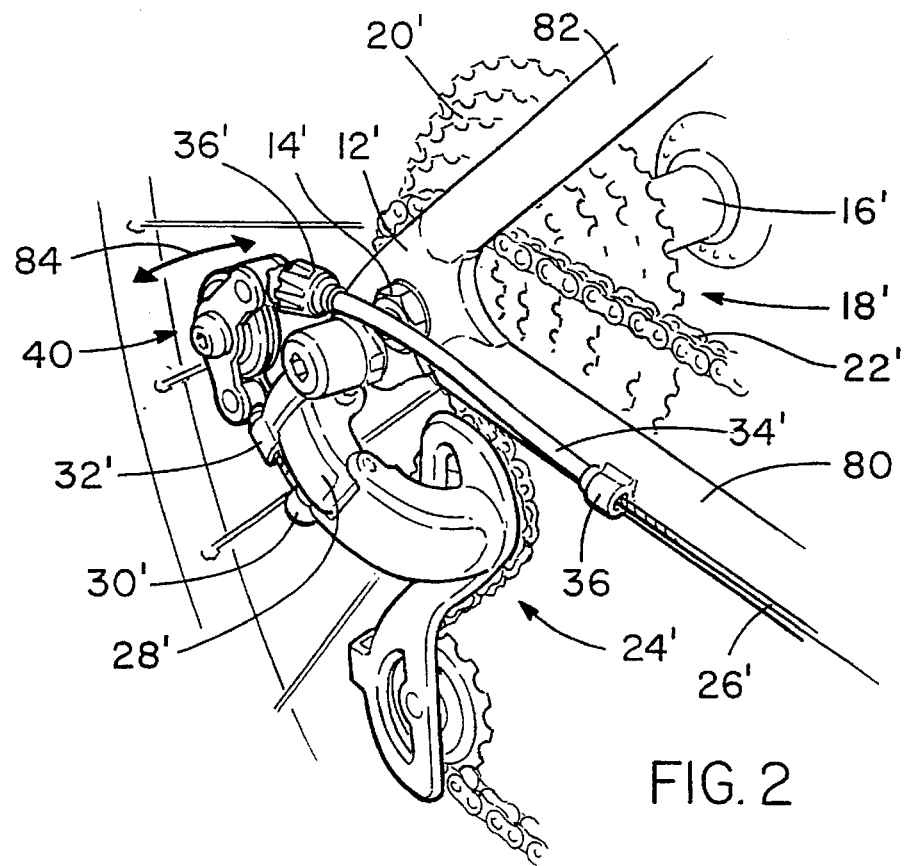
FIG. 2 is a perspective view which shows the low-friction derailleur cable router of the present invention replacing the cable housing to route a derailleur cable to the rear of a conventional rear feed derailleur.

FIG. 2 is similar to FIG. 1, differing only in that the low-friction derailleur cable router 40 has replaced the portion of the cable housing 34 which functions to redirect the derailleur cable 26 in rearward attachment to the actuator arm 28 of the derailleur 24. Because of the otherwise identity in the drawings, like elements are indicated with the same reference numeral followed by a prime (') and can be understood with reference to the discussion of the prior art in FIG. 1 as set forth above in the Background Art section of this application.

As illustrated in FIG. 2, the low-friction derailleur cable router 40 is positioned between a length of cable housing 34' and a derailleur cable feed 32' of the derailleur 24'. The low-friction derailleur cable router 40 redirects the derailleur cable 26' which extends from the forward portion of the bicycle so that the derailleur cable 26' can be attached rearwardly of the rear derailleur 24'.

Figure 3:
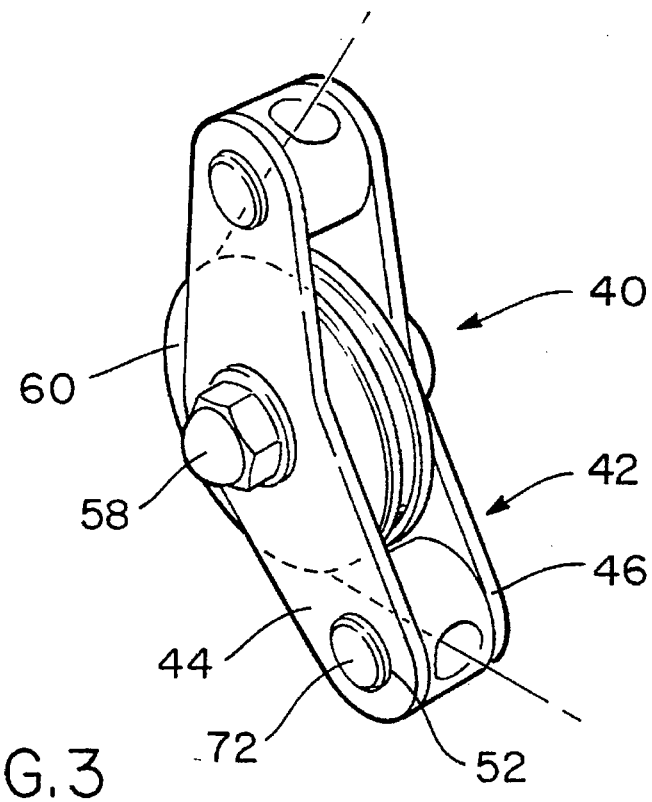
FIG. 3 is a perspective view of the low-friction derailleur cable router depicted in FIG. 2.
Figure 4:
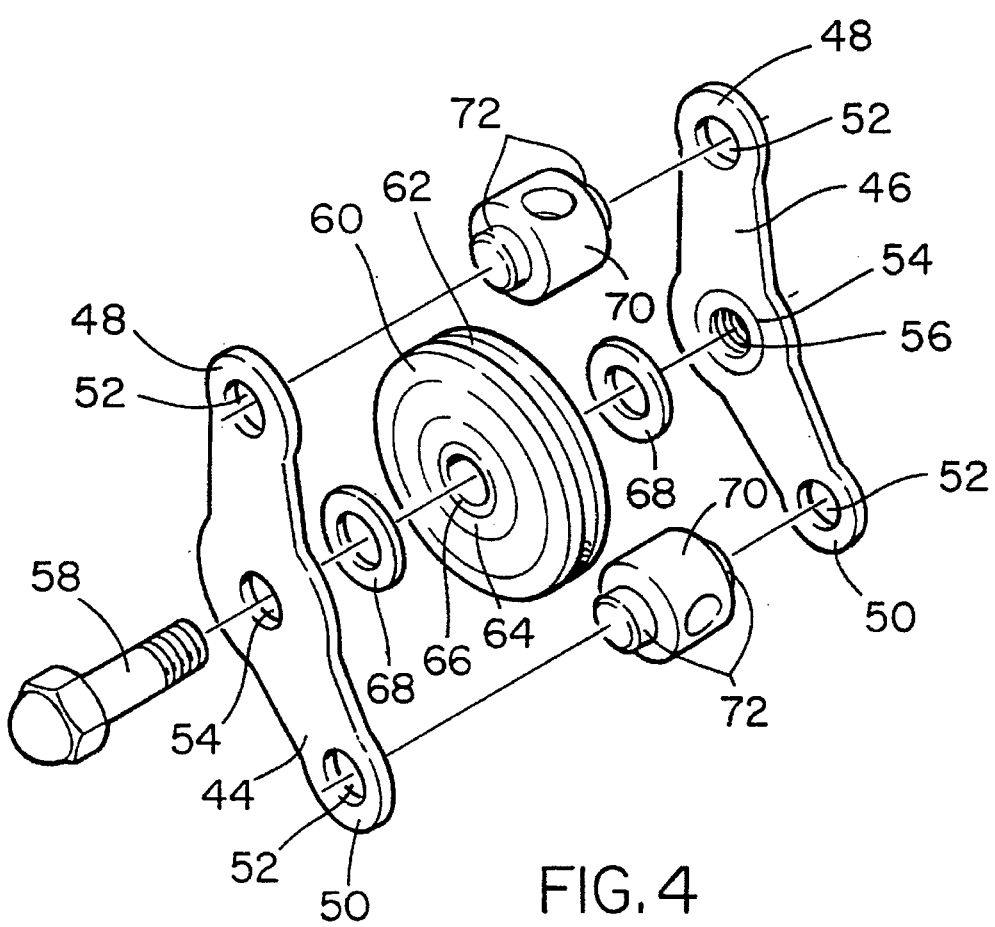
FIG.4 is an exploded perspective view of the second embodiment of the low-friction derailleur cable router depicted in FIG. 3.

The low-friction derailleur cable router 40 depicted in FIG. 2 is a first embodiment of the low-friction cable router described herein. This first embodiment is shown in greater detail in FIGS. 3 and 4. The first embodiment of the low-friction derailleur cable router 40 consists of a frame 42 made up of first and second plates 44, 46. Each of the plates 44, 46 include a first end 48 and a second end 50, each of which has a through hole 52. Between the first and second ends 48, 50 in the middle of each of the first and second frame plates 44, 46 is a connecting hole 54. As seen in FIG. 4, the connecting hole 54 in the second frame plate 46 receives a female threaded press fit nut 56 therein configured to threadably engage the threaded end of the bolt 58. The first embodiment of the low-friction derailleur cable router 40 further includes a pulley 60 having a circumferential groove 62 in its radial edge. The circumferential groove 62 is sized to receive a standard derailleur cable 26'. The pulley 60 includes a cartridge bearing 64 at its axis of rotation for minimizing friction as the pulley 60 is rotated. Of course, the cartridge bearing 64 could be replaced by a bushing made out of plastic or metal or some other structure which would also facilitate low-friction rotation of the pulley 60 about its axis somewhat less efficiently than a cartridge bearing, but at a lower cost than the cartridge bearing 64. The cartridge bearing 64 includes an annular protrusion 66 on each side which extends beyond the width of the pulley 60 so that with the pulley 60 sandwiched between the first and second frame plates 44, 46 the annular protrusion 66 contacts the plates 42, 44 and the pulley 60 is free to rotate without interference from the plates 42, 44. Sandwiched between the annular protrusions 66 of the cartridge bearing 64 on the side of the pulley 60 are washers 68. The washers 68 function as spacers to further separate the plates 44, 46 from the pulley 60. Also sandwiched between the plates 44, 46 are a pair of linkages 70, each of which is identical in shape. Each linkage 70 includes an annular boss 72 on each side sized to be snugly received in the through holes 52, as best seen in FIG. 3.

FIG. 14 is a front elevational view of the linkages 70. Each linkage has a counter sunk bore 74 which includes a smaller diameter cable channel 76 coaxial with a receiving bore 78. The body of the linkage 70 is preferably cylindrical.

FIG. 4 illustrates the "sandwiched" assembly of the first embodiment of the low-friction cable derailleur 40. Once assembled, the linkages 70 can be rotated about their axis to redirect the opening of the receiving bore 78 so as to fit a variety of directions of feed of the derailleur cable 26'. More particularly, referring to FIG. 2, as illustrated the derailleur cable 26' runs along the chain stay 80. Some bicycles run the derailleur cable 26' along the seat stay 82. Merely by rotating the linkage 70 associated with the first end 48 of the frame 42 the low-friction cable router 40 may be properly aligned, regardless of whether the derailleur cable is fed along the seat or chain stay.

The interior of the receiving bore 78 may be threaded as indicated at 84 of FIG. 15. Internal threading of the receiving bore 78 allows for threaded engagement with the barrel tension adjuster 36'. As understood by those skilled in the art, this allows for adjusting the tension in the cable 26' to fine tune or adjust the rear derailleur 24'.

The low-friction derailleur cable router is depicted mounted between a derailleur and a cable housing in FIG. 2. The low-friction derailleur cable router 40 is attached to the rear derailleur by sizing the cable housing 34 lengthwise so that the end of the cable housing 34 is above but at approximately the same point as the derailleur cable feed 32'. The barrel tension adjuster 36' is threadably engaged in the receiving bore 78 of the upper linkage 70 and the cable 26 is fed through the tension adjuster 36', into the receiving bore 78 and cable channel 76 of the upper linkage 70, into the circumferencial groove 62 of the pulley 60, around the pulley 60, into the cable channel 76 of the lower linkage, out the receiving bore 78 of the lower linkage, through the derailleur cable feed 32' of the rear derailluer 24' and attached to the clamp 30' on the actuator arm 28' of the rear derailluer. The forward bias of the derailluer maintains tension in the cable 26' which holds the low-friction derailluer cable router 40 in the position illustrated in FIG. 2. Because there is no rigid connection between the lower linkage 70 and the derailluer, the low-friction derailluer cable router 40 can be deflected inward and outward as illustrated by the arrow 84 of FIG. 2. Once the force causing the deflection is removed, the low-friction derailleur cable router 40 snaps back into its original position due to the tension in the derailleur cable 26'.

Instead of merely having the lower linkage 70 abut the derailluer cable feed 32 as illustrated in FIG. 2, it may be desirable to provide a structure for break-away attachment between the derailluer cable feed 32' and the lower linkage 70. In a preferred embodiment, this break-away attachment may be one of the embodiments illustrated in FIG. 5 discussed in greater detail below. Alternatively, the structure for break-away attachment may be the bolt 88 illustrated in FIG. 16. The bolt 88 has a semi-spherical head 90 with an annular flange 90 at its base and an axial derailluer cable receiving passage 92. The bolt 88 is threadably engaged in a threaded bore (not shown) of the derailluer cable feed 32'. The semi-circle head 90 is received in the receiving bore 78 of the lower linkage 70. This break-away attachment structure helps facilitate proper alignment of the low-friction cable router relative to the rear derailluer following displacement is indicated by the arrow 84 of FIG. 2.

Figure 5:
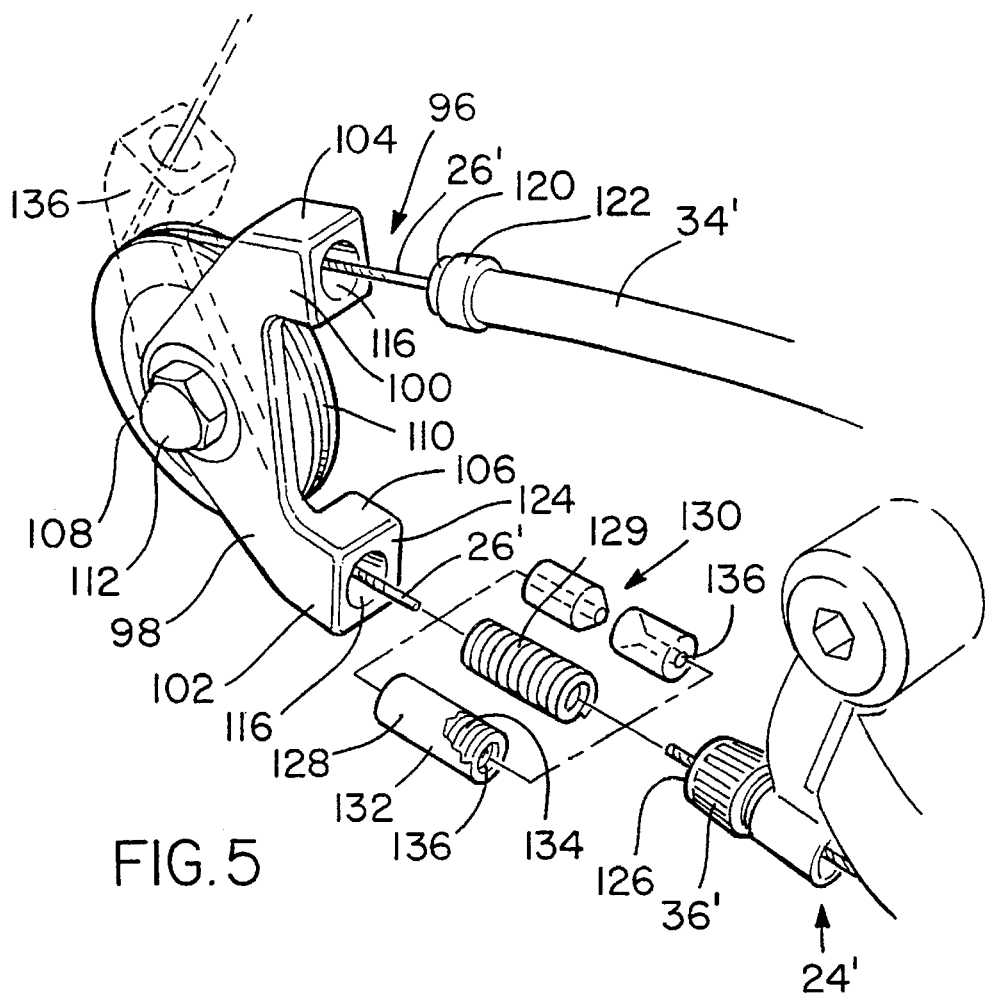
FIGS. 5–6 are partially exploded perspective views of a low-friction derailleur cable router of the present invention.

FIG. 5 illustrates a second embodiment of the low-friction derailluer cable router 96. The second embodiment has an essentially C-shaped frame 98 having a first end 100 corresponding to the top of the C and a lower end 102 corresponding to the bottom end of the C. A first housing 104 extends a direction normal to the C-shaped frame at the top 100 of the frame and a second housing 106 extends the same direction normal to the frame 98 at the second end of the frame 102. As with the first embodiment 40 discussed above, a pulley 108 having a circumferencial groove 110 in its radial edge is mounted for rotation to the frame 98 intermediate the first and second ends 100, 102. The pulley 108 may be identical in all respects to the pulley 60. A bolt 112 secured by a nut (not shown) mounts the pulley. Washers and the like may be used as described with the first embodiment 40. Referring to FIG. 12, each of the upper and lower housings 104, 106 have a counter sunk bore 114 which includes a large diameter receiving bore 116 and a small diameter cable channel 118.

The second embodiment 96 illustrated in FIG. 5 functions similarly to the first embodiment 40 in FIGS. 3 and 4. The receiving bore 116 of the first housing 104 is sized to receive the leading edge 120 of a ferrule 112 at the end of a length of cable housing 34'. The leading surface 124 of the second housing 106 may abut directly the barrel tension adjuster 36' on a rear derailluer 24'. In a preferred form of the second embodiment, a break-away attachment structure is provided which fits within the receiving bore 116 of the second housing 106 and within a similarly sized cavity in the leading surface 126 of the barrel adjuster 36'. The break-away attachment structure may be one of a length of cable housing 128, a coil spring 129 or male/female cone segments 130. The length of cable housing 128 is shown with a piece of the casing 132 removed to reveal a coil 134 which underlies the casing 132. Each of the length of cable housing, male/female cone segments and the coil spring include a passage 136 through which the derailluer cable 26' passes. The break-away attachment structures help keep the low-friction cable router 96 properly aligned following deflection of the low-friction cable router should it be struck by.an obstruction or the like in the same manner described above with respect to the first embodiment of the low-friction derailluer cable router 40. The second embodiment 96 is also held in position by tension in the derailleur cable 26' created by the derailluer 24' and the cable 26' is fed through the second embodiment 96 in the same manner as discussed above with respect to the first embodiment 40.

The second embodiment 96 illustrated in solid lines in intended for use where the derailluer cable 26' is run along the chain stay 80 as seen in FIG. 2. The angle between the legs of the frame 98 is approximately 15°. For those cycles where the derailluer cable 26' runs along the seat stay 82, a more open frame, illustrated by the ghost lines 136 is contemplated, where the angle between the legs is about 60°. Except for the wider angle, this embodiment is identical to the second embodiment 96. The present invention contemplates an angle between the legs ranging between 0° and 90°.

Figure 6:
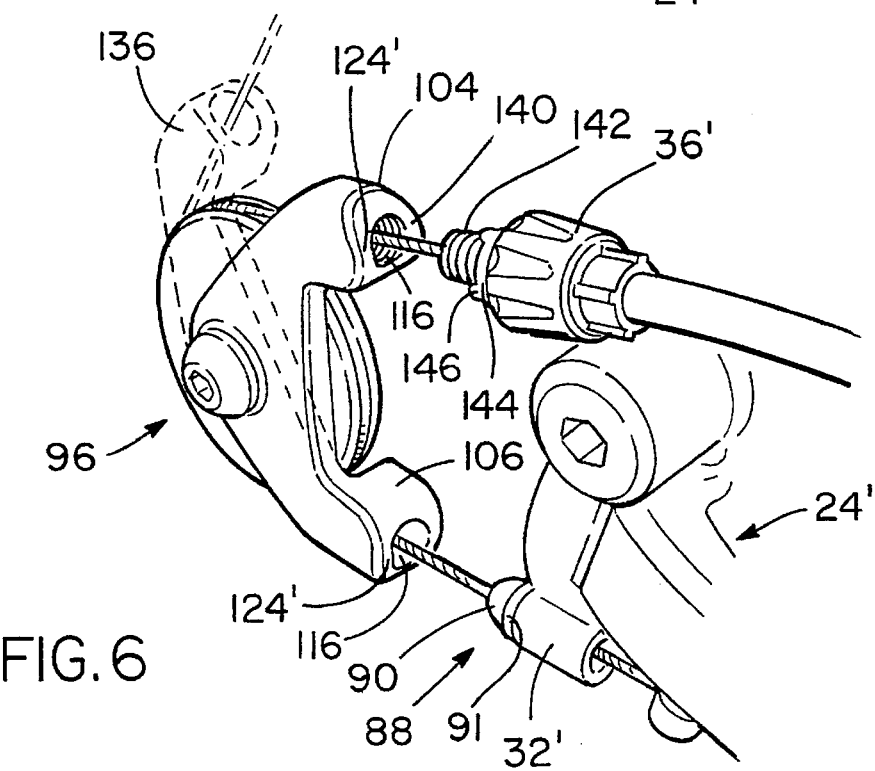

FIG. 6 illustrates a modified and preferred version of the second embodiment of the low-friciton cable router 96. This version includes internal female threads 140 in the receiving bore 116 of the first housing 104. In addition, the break-away structure in this embodiment is the bolt 88 illustrated in FIG. 16 featuring the semi-spherical head 90. The semi-spherical head 90 is received within the receiving bore 116 of the second housing 106. The embodiment in FIG. 6 further differs in that the leading surface 124' of both first and second housings 104, 106 is arcuate. The female threads 140 are configured to threadably engage the threaded conduit 142 which is part of the barrel tension adjuster 36'. The barrel adjuster 36' shown in FIG. 6 includes an alignment ring 144 having four 90° radially spaced projections 146. As appreciated by those skilled in the art, these projections are intended to be received in grooves in the abutting surface of the derailluer cable feed 32' of the rear derailluer 24' to index adjustment of the barrel tension adjuster. However, with the tension adjuster 36' moved from threaded engagement with the derailluer cable feed 32' to threaded engagement with the first housing 104 as depicted in FIG. 6, the spaces between the projections 146 receive the arcuate leading surface 124 of the second embodiment of the low-friction cable router 96 depicted in FIG. 6 to provide the same indexing as was provided by engagement of the projections 146 with the grooves of the derailluer cable feed 32'. An advantage of the arcuate leading surface 124' of the second housing 106 is that because the angle between the derailluer cable feed 32' and the chain stay 80 of various bicycles may change, the arcuate surface as opposed to a flat surface will provide a more constant cable length between the derailleur and the pulley. That is, the arcuate surface will "roll" up or down with the semi-spherical head 90 of the bolt 88 received in the receiving bore 116, providing a smooth, continuous, connection as opposed to a space that would result if the leading surface 124' was flat as illustrated in FIG. 5. In addition, this connection is more aesthetically pleasing to observers.

FIGS. 7 and 8 illustrate an alternative embodiment 96' of the second embodiment of the low-friciton cable router 96 illustrated in FIGS. 5 and 6. This embodiment provides a second wall 150 as part of the C-shaped frame 98. In all other respects, this embodiment is identical to that shown in FIG. 5 and may include the modifications illustrated in and discussed with respect to FIG. 6. FIG. 8 merely shows the "open C" configuration of the frame 98 illustrated by the ghost lines 136 of FIG. 5.

FIG. 9 illustrates a third alternative embodiment of the low-friction cable router 150. This third embodiment is similar to the embodiment shown in FIG. 5, only the frame 98 is broken into separate first and second legs 152, 154. Each of the legs 152, 154 includes a connection hole 156 with annular knurling 158 surrounding the connecting hole 156. The bolt 112 (not shown in FIG. 9) fits through the connection holes 156 and holds the first and second legs 152, 154 juxtaposed with the knurled surfaces in engagement. The knurled surfaces help hold the first and second legs at a select rotative position. By loosening the bolt 112 the knurling can be disengaged and the first and second legs rotated relative to one another as indicated by the arrow 160 to assume a different relative orientation as illustrated by the phantom first leg 152'. In all other manners the third embodiment 150 is identical to the second embodiment 94 illustrated in FIGS. 5 and 6 and may inlcude the various modifications discussed above.

FIG. 10 is a fourth embodiment of the low-friction cable router 170. This embodiment is similar to the second embodiment 96' illustrated in FIGS. 7 and 8 with the frame 98 divided into first and second legs 172, 174. Each of the legs 172, 174 includes a connecting hole 156 for receiving a bolt 112 (not shown in FIG. 10). The second leg includes a pair of locking holes 176 radially spaced from the connecting hole 156. The first leg 172 includes a receptor hole (not shown) which can be brought into and out of alignment with the various locking holes 156 to change the relative position of the first and second legs to accommodate different bicycles where the derailluer cable 26' may be fed along either the chain stay 80 or the seat stay 82. A pin 178 is received in one of the locking hole 156 or a receptor hole when aligned to maintain the legs in the select position.

FIG. 11 illustates a fifth embodiment of the low-friction cable router 180 wherein it is integrally formed with the rear derailluer 24'. In this embodiment the router frame 182 is formed as part of the rear derailluer 24' frame and the derailluer cable feed is combined with the second housing of the cable router. Although not shown in FIG. 11, a barrel tension adjsuter could be provided in operative association with the first cable housing 186 in the manner illustrated in FIGS. 2 and 6.

What is claimed is:

1. A derailleur cable router for changing the direction of a derailleur cable operatively attached to a rear derailleur mounted to a bicycle frame, the rear derailleur being actuated by variation in tension applied by the derailleur cable from a direction rearward of the derailleur, the tension in the derailleur cable being controlled by a shifter attached to a distal end of the derailleur cable, the shifter being mounted to the bicycle frame forward of the derailleur, the derailleur cable including a cable housing around at least a portion of the derailleur cable, the derailleur cable housing being attached to the bicycle frame to fix the cable housing against lengthwise movement relative to the bicycle frame, the derailleur cable router comprising:

a frame having at a first end means for attachment to a derailleur cable housing and at a second end means for attachment to a derailleur cable feed of a rear derailleur, the means for attachment to a derailleur cable housing including a first cable channel for receiving a derailleur cable from within a derailleur cable housing and the means for attachment to a rear derailleur cable feed including a second cable channel for passing a derailleur cable to a rear derailleur cable feed;

a pulley wheel having an axis of rotation and a circumferencial groove; and means for mounting the pulley wheel by its axis of rotation to the frame for rotation relative to the frame intermediate the first and second ends of the frame with the circumferencial groove of the pulley aligned with the first and second cable channels so that a derailleur cable can be received in the first cable channel, engaged with a portion of the circumferencial groove and passed through the second cable channel.

2. The derailleur cable router of claim 1 wherein the first cable channel, the second cable channel and the circumferencial groove of the pulley lie in substantially the same plane.

3. The derailleur cable router of claim 1 wherein the frame comprises a C shaped plate with the first end at the top of the C and the second end at the bottom of the C.

4. The derailleur cable router of claim 1 wherein the means for attachment to a derailleur cable housing comprises a first housing extending from the first end of the plate a direction normal to the plate, the first housing containing the first cable channel and having a bore coaxial with the first cable channel, the bore being sized to receive a leading end of a ferrule attached to an end of a cable housing and the means for attachment to a derailleur cable feed of a rear derailleur comprises a second housing extending from the second end of the plate the direction normal to the plate, the second housing containing the second cable channel and having a leading surface through which the second cable channel passes, the leading surface being configured to abut a derailleur cable feed of a rear derailleur.

5. The derailleur cable router of claim 4 wherein the means for attachment to a derailleur cable feed of a rear derailleur further comprises a second bore coaxial with the second cable channel, the second bore being sized to receive a means for break-away attachment between a derailleur cable feed and the second housing.

6. The derailleur cable router of claim 5 wherein the means for break-away attachment comprises a screw configured to be threadably engaged with a derailleur cable feed of a rear derailleur, the screw having a semispherical head received by the second bore, the screw further including an axial derailleur cable receiving passage.

7. The derailleur cable router of claim 5 wherein the means for break-away attachment comprises a coil spring.

8. The derailleur cable router of claim 5 wherein the means for break-away attachment comprises a length of cable housing.

9. The derailleur cable router of claim 4 wherein the bore of the means for attachment to a derailleur cable housing is internally threaded in a manner to threadably engage male threads of a barrel cable length adjuster attached to an end of a cable housing.

10. The derailleur cable router of claim 1 wherein the frame further comprises a first leg having a proximal end and a distal end to which the means for attachment to a derailleur cable housing is attached and a second leg having a proximal end and a distal end to which the means for attachment to a derailleur cable feed of a rear derailleur is attached, the proximal ends of the first and second legs being connected by connection means for selectively allowing relative rotation between the first and second legs.

11. The derailleur cable router of claim 10 wherein the proximal ends of the first and second legs each have a knurled portion around a connecting hole and the proximal ends are juxtaposed with the knurled portions in abutment.

12. The derailleur cable router of claim 10 wherein the connection means comprises a bolt through the connecting holes threadably engaging a nut.

13. The derailleur cable router of claim 10 wherein the proximal ends of the first and second legs each have a connecting hole coaxial with the axis of rotation of the pulley, the proximal ends of the first and second legs being juxtaposed with their respective connecting holes aligned and the connection means comprises means holding the legs together for rotation about their connection holes and one of the first and second legs having at least two locking holes radially spaced from the connecting holes and the other of the first and second legs having a receptor hole radially spaced a like distance, the legs being rotatable about the connection holes to selectively bring each locking hole into alignment with the receptor hole, and a pin axially received in an aligned locking hole and receptor hole, the pin being removable to allow another locking hole to be brought into alignment with the receptor hole whereupon the pin can be reinserted to hold the legs in a new select relative position.

14. A rear derailleur of a bicycle for mounting to a bicycle frame in operative association with a derailleur cable, the rear derailleur being actuated by variation in tension applied by the derailleur cable attached to an actuator arm of the derailleur from a direction rearward of the derailleur, the tension in the derailleur cable being controlled by a shifter attached to a distal end of the derailleur cable, the shifter being mounted to the bicycle frame forward of the derailleur, the derailleur cable including a cable housing around at least a portion of the derailleur cable, the derailleur cable housing being attached to the frame to fix it against lengthwise movement relative to the bicycle frame, the rear derailleur comprising:

a frame having at a first end means for attachment to a derailleur cable housing and a second end integrally attached to the actuator arm of the derailleur, the means for attachment to a derailleur cable housing including a first cable channel for receiving a derailleur cable from within the derailleur cable housing and the second end of the frame including a second cable channel for passing a derailleur cable to a means for securing a derailleur cable on the actuator arm of the rear derailleur;

a pulley wheel having an axis of rotation and a circumferencial groove; and means for mounting the pulley wheel by its axis of rotation to the frame for rotation relative to the frame intermediate the first and second ends of the frame with the circumferencial groove of the pulley aligned with the first and second cable channels so that a derailleur cable can be received in the first cable channel, engaged with a portion of the circumferencial groove and passed out of the second cable channel for attachment to the means for securing a derailleur cable.

15. The rear derailleur of claim 14 wherein the means for attachment to a derailleur cable housing comprises a first housing extending from the first end of the plate a direction normal to a plane within which the plate lies, the first housing containing the first cable channel and having a bore coaxial with the first cable channel, the bore being sized to receive a leading end of a ferrule attached to an end of a cable housing.

16. The rear derailleur of claim 15 wherein the bore contains internal threads sized to receive male threads of a barrel cable tension adjuster at an end of a cable housing.

17. The rear derailleur of claim 14 wherein the first cable channel, the second cable channel and the circumferencial groove of the pulley lie in substantially the same plane.

* * * * *